(12) United States Patent
Linnett et al.

(10) Patent No.: US 6,771,163 B2
(45) Date of Patent: Aug. 3, 2004

(54) SIGNALLING DEVICE AND COMMUNICATIONS SYSTEM

(75) Inventors: Malcolm Robert Linnett, Queensland (AU); Ben Lancini, Queensland (AU)

(73) Assignee: Linlan Research and Development Company PTY LTD, Queensland (AU)

( * ) Notice: Subject to any disclaimer, the term of this patent is extended or adjusted under 35 U.S.C. 154(b) by 0 days.

(21) Appl. No.: 10/221,647

(22) PCT Filed: Apr. 6, 2001

(86) PCT No.: PCT/AU01/00398

§ 371 (c)(1),
(2), (4) Date: Sep. 16, 2002

(87) PCT Pub. No.: WO01/78032

PCT Pub. Date: Oct. 18, 2001

(65) Prior Publication Data

US 2003/0034881 A1 Feb. 20, 2003

(30) Foreign Application Priority Data

Apr. 6, 2000 (AU) .............................. PQ 6729

(51) Int. Cl.[7] .............................................. G08B 1/00
(52) U.S. Cl. .............................. 340/309.5; 340/309.16; 340/573.1
(58) Field of Search .................. 340/309.16, 309.5, 340/531, 573.1; 455/404.1, 404.2, 456.2; 379/40, 46, 49, 51, 59

(56) References Cited

U.S. PATENT DOCUMENTS

| | | | | |
|---|---|---|---|---|
| 4,337,463 A | * | 6/1982 | Vangen | 340/309.1 |
| 5,045,839 A | | 9/1991 | Ellis et al. | |
| 5,542,100 A | * | 7/1996 | Hatakeyama | 455/56.1 |
| 5,852,401 A | | 12/1998 | Kita | |
| 5,890,061 A | * | 3/1999 | Timm et al. | 455/404 |
| 5,990,793 A | | 11/1999 | Bieback | |

\* cited by examiner

Primary Examiner—Anh V. La
(74) Attorney, Agent, or Firm—Young & Thompson

(57) ABSTRACT

Provided is an emergency signalling device and system by which emergency signals are transmitted for reception by an emergency authority when a user set time for the transmission elapses without cancellation or reset. The device may be a telephone or a beacon. In an example the system is a digital mobile phone messaging system using a terrestrial and/or satellite based radio communications wherein the device in the form of a mobile telephone or short messaging service (SMS) capable transceiver automatically transmits an emergency or distress signal addressed to a search and rescue (SAR) or emergency service organization within a preset time interval in the event of incapacitation of the user.

30 Claims, 18 Drawing Sheets

SIGNALLING DEVICE AND COMMUNICATIONS SYSTEM

TECHNICAL FIELD OF THE INVENTION

THIS INVENTION relates to a signalling device which can be set to signal for assistance at a specified time, and in particularly but not limited to a communications system including at least one signalling device in the form of a mobile telephone and a storage means adapted for a user to store information relating to intended travel plans and medical conditions, and the system can be set to call emergency services at a specified time set by a user so that authorities providing the emergency services can quicky locate the user and organise medical equipment that may be needed to treat the medical conditions of the user if the user is involved in an emergency or condition that prevents the user from operating a telephone or other communications device.

BACKGROUND OF THE INVENTION

Throughout the world there are numerous existing personal signalling devices designed for the purpose of signalling for assistance in an emergency on behalf of a person in distress.

In remote regions on land, at sea, or in air, radio frequency beacons can be used to signal for assistance during an emergency situation. These devices must be physically switched on and manually activated in order to initiate transmission of radio frequency distress signals directed at emergency services and search and rescue [SAR] organisations. Should a person carrying such a device, through illness or some accidental mishap becomes incapacitated, and is unable to manually operate the device a timely request for assistance can not be made. In addition, such devices do not indicate the location of that person and the transmitted signals can only be used for a rough estimation of the location of the person. Under such circumstances loss of life may eventuate.

At home or at work both land line telephones and mobile telephones can be used to call emergency services. Like the beacons mentioned above, a person must manually dial the emergency telephone number and when the call is answered the person must be able to speak in order to communicate the location and the type of assistance needed.

Mobile telephone networks divide their service regions into cells. Each of the cells may have one or more transmission stations for relaying signals between adjacent transmission stations or between a transmission station and a transceiver of a local telephone network which has trunk lines connected to other local networks. These mobile telephone networks have developed to the extent that mobile telephone services are available in most countries in the world. In more developed countries these services cover substantially all densely populated regions of the countries. Because of the extensive coverage, mobile telephones have been used to call for assistance when persons with such telephones are in difficulty during boating, hiking, travelling or the like. However at sea, and in remote land regions of large countries like Australia and the United States of America the coverage extends only a few kilometers out of the coast lines and a few kilometers into the remote regions.

Outside of the serviceable mobile telephone network, emergency requests for assistance can be handled by satellite communication systems. An international consortium of SAR organisations operates a satellite-based system known as the Cospas-Sarsat. This system and its continuing development offer near total global coverage for registered operators of:

(1) Personal Location Beacons [PLBs] for Handheld Devices;
(2) Emergency Position Indicating Radio Beacons [EPIRBs] for Maritime Use; and
(3) Emergency Locator Beacons [ELBs] in Aviation Use.

These devices can transmit a distress signal that include an encoded datagram containing the operator's identity, nationality, nature of emergency, and embedded Global Positioning Satellite [GPS] positional data. This signal is monitored by the Cospas-Sarsat satellite array and relayed to receiving stations known as Local User Terminals [LUTs] that in turn relay this information to SAR and emergency services proximate to the beacon.

Again, these devices must be manually switched and activated in order to transmit the distress signal. For use at sea some of these devices can be caused to automatically transmit distress signals when their water-sensitive transducer is in salt water. Car telephones have also been deployed to automatically dial emergency numbers when the car is involved in a collision. These car telephones are typically caused to dial such call by impact switches installed in the cars.

But, if a person is alone and he is unconscious or so injured that he is unable to use his mobile telephone, land line telephone, beacon or satellite communications device, emergency assistance is not available. Accordingly there is a need for a system that will alert emergency authorities in this situation.

In many situations persons injured in accidents or needing medical attention must be attended to quickly. Complications may occur where inappropriate medical treatment is applied to a person with existing medical condition. It is therefore desirable to have a system which informs emergency authorities any existing medical condition.

OBJECT OF THE INVENTION

An object of the present invention is to alleviate or to reduce to a certain degree one or more of the above prior art disadvantages.

SUMMARY OF THE INVENTION

In one aspect therefor the present invention resides in an emergency signalling device comprising a transmitter adapted to transmit a time setting signal to a remote monitoring station, and setting means for selectively setting a time for a timer to initiate communication of an emergency signal for reception by an emergency authority.

In another aspect therefor the present invention resides in an emergency signalling device comprising a transmitter adapted to transmit an emergency signal to a remote monitoring station, a timer and setting means for selectively setting a time for the timer to initiate the transmitter to transmit said signal at the time set by said setting means.

In yet another further aspect therefore the present invention resides in an emergency signalling system. The system comprises an emergency communications network, a monitoring station, and at least one emergency signalling device having a transmitter adapted to communicate with said monitoring station over the communications network. The system further comprises a timer in said monitoring station or said at least one emergency signalling device. The or each said at least one emergency signalling device has setting means for selectively setting the timer to initiate said monitoring station or the transmitter to transmit an emergency signal at a time set by said setting means.

In a further aspect therefore the present invention resides in an emergency signalling system The system comprises an emergency communications network, a monitoring station including at least one server having a storage means for storing user information, and at least one emergency signalling device having a transmitter adapted to communicate with said at least one server over the communications network. The system further comprises a timer in said monitoring station or said at least one emergency signalling device. The or each said at least one emergency signalling device has setting means for selectively setting the timer to initiate said at least one server or the transmitter to transmit an emergency signal at a time set by said setting means.

Preferably said emergency signal corresponds to at least one emergency contact reference for calling emergency assistance. An example of such contact reference is "000" where the device is a telephone.

The device may have memory means for storing at least one emergency reference. Alternatively the storage means of said at least one server can be arranged to store at least one emergency reference.

Desirably the system is arranged to associate user references with respective user information. The at least one server is arranged for a user to access over said emergency network for storing or updating user information and to retrieve stored user information. In use, where the timer is in the or each said at least one emergency signalling device transmission of said contact reference from the or each said at least one emergency signalling device is relayed over the emergency network to said at least one server. The at least one server on receiving said contact reference is adapted to search for a match of the user reference in said contact reference with the user references on the storage means and to retrieve the user information associated with the matched user reference for use by the emergency authority.

Where the timer is in said monitoring station, the server is arrange to monitor the time(s) set by the or each said at least one emergency signalling device. When a set time elapses said monitoring station is arranged to retrieve from the storage means the user information associated with the signalling device concerned and relay the retrieved information to an emergency authority.

In preference, said signalling device is a radio frequency signalling beacon and its transmitter is adapted to transmit a radio frequency (RF) signal at a predetermined emergency frequency. The RF signal may include at least one emergency contact reference. Said signalling device may also be a telephonic communications device and its transmitter having a dialling means arranged for initiation by said timer to dial at least one emergency contact reference for transmission by said transmitter at the set time.

The memory means may also store user information which can be retrieved for transmission with said at least one emergency contact reference.

It is preferred that the signalling device includes a global positioning satellite (GPS) receiver adapted to periodically receive GPS signals for deriving location information for storage in said memory means. The stored location information is advantageously transmitted with said at least one emergency contact reference.

The device may have a user actuatable time delay switch adapted to, when actuated, switch the transmitter to transmit the signals corresponding to said at least one emergency contact reference at the set time.

A warning indication may be arranged to indicate that the device is about to initiate transmission of signals corresponding to said at least one emergency contact reference. Preferably the device is arranged to prevent said transmission by actuating the time delay switch during said warning indication.

In preference, said device further comprises a receiver for receiving communications signals over a telephone network and/or a satellite communications network, and a key pad having numerical keys for entering signals corresponding to numbers. The device is arranged so that a user can use the key pad to manually dial the or one of said at least one emergency contact reference, or any other telephone contact number for transmission over said telephone network and/or said satellite communications network. More preferably the device includes an emergency switch which is arranged to dial the or one of said at least one emergency contact reference when it is switched on.

Advantageously said memory means is also adapted to store user reference and the user reference is transmitted with the or one of said at least one emergency contact reference. Typically said user reference includes a user name and a personal identification number (PIN).

The memory means may be a SIMM card.

The device of the present invention may also have a location beacon which is adapted to transmit beacon signals intermittently. Preferably said location beacon is arranged to automatically transmit said beacon signals following initiation of transmission of said at least one emergency reference at said specified time. A beacon switch is suitably provided to manually switch said location beacon On and OFF. More preferably said location beacon may be remotely controlled to switch On by a control signal received over the mobile telephone network and/or the satellite communications network.

The device may be selectively switched to a suspension mode for suspending operation of said location beacon and/or the operation of emergency signalling. Preferably the device when in said suspension mode is arranged to transmit a signal indicating that it is in suspension mode.

The device is typically arranged to transmit said beacon signals for reception by the mobile telephone network or the satellite communications network. A switch over arrangement may be provided for switching between transmissions to the mobile telephone network and to the satellite network. Desirably the switch over arrangement includes a signal strength measuring unit for measuring signals received from the telephone network, and a network switching unit arranged to switch to satellite transmission mode when the received network signals are below a predetermined level.

The device of the present invention may be provided with a reset switch for resetting information in said memory means to factory defaults.

Preferably said device has an indication means arranged to indicate at least one of user settable items which include said specified time, time of day, date, user PIN, and the like. The indication means may also be arranged to indicate battery state, operation mode of the device, and/or signal strength, and the like.

The indication means may be a liquid crystal display (LCD) unit or an active matrix unit. It is preferred that the LCD unit has a backlit screen.

Desirably said setting means includes a menu selection arrangement for selectively viewing the or each said settable item. The setting means may also include an item setting arrangement for selectively setting the or any of the settable items. Typically said menu selection arrangement has a menu selection button configured for selecting the or a successive one of the settable items for indication on the indication means. Where an item is made up of two or more sub-items the menu selection button when pressed can be configured to move to a successive sub-item or the successive item when on a last sub-item. The setting arrangement can have a setting button for setting the item or sub-item indicated on the indication means. Alternatively the setting arrangement can have a setting button for setting the item or the highlighted sub-item on the indication means. The setting button can be arranged to advance through integers within the item or sub-item when the setting button is being pressed. As an alternatively the setting button can be arranged to set the item or sub-item for setting by the key pad.

It is preferred that the switches and/or buttons are also backlit.

A power switch may be provided for switching the device ON and OFF. Advantageously the device has a power saving arrangement so that a substantially reduced power is consumed in a selected mode of operation. Preferably said selected mode is a standby mode when said time delay switch is ON. A power saving indicator can be provided to indicate that the device is in said selected mode.

Desirably said device has a housing body with a front face, a base and opposed side walls joining said front face and said base, and said switches and/or buttons are provided on said front face. The key pad can be provided on said front face or one of said side walls. It is preferred that said key pad is provided on said on side wall so that the switches and/or buttons can be of a sufficient large size for easy actuation.

The device may be powered by one or more battery units. Preferably a battery chamber for accommodating said one or more battery units is provided in the housing body and the base has an opening to said chamber and an openable cover part arranged for covering the opening when in the closed position and for replacement of said one or more battery units when in the open position. It is also preferred that the cover part is hingedly joined to adjacent part of the base so that the cover part can be opened by a rotating motion about the hinge joint.

So that the device can be used in wet weather and during boating it can be made substantially waterproof.

The device can also be made substantially shock resistant so that it can be used by a person engaging in activities such as hiking in rugged terrains, rock climbing and the like.

In another aspect therefore the present invention resides in a mobile telephone apparatus comprising the device as hereinbefore described.

The user information may include personal details such as user's and a contact person's names, addresses, contact numbers, and/or medical records, and/or user's photograph, and/or voice or text message relating to intended activity and location, and/or mobile telephone cell location, and/or device operation mode.

Typically the user information can be transmitted for storage through the World Wide Web (WWW) and/or a telephone connection.

The system can be arranged so that the retrieved user information is automatically sent to the emergency authority. Alternatively an operator may inform the user information to the emergency authority.

The system can also be arranged to remotely switch operation mode of the at least one emergency signalling device. Typically the system can be arranged so that said at least one emergency signalling device can be switched to transmit the beacon signal for reception by the telephone or satellite network.

Where a suspension signal is received from said at least one emergency signalling device the system may be arranged to suspend monitoring of the device. The system may recommence said monitoring upon receiving a new registration signal from said device.

In a preferred form the emergency network is arranged to receive the emergency contact reference through said mobile telephone network and/or the satellite network.

In a typical example the system according to the present invention is in the form of an international satellite distress beacon messaging system wherein the device is a personal location beacon [PLB] which automatically sends an emergency or distress signal within a predetermined time interval in the event of incapacitation of the user. The PLB has a timer for selectively setting a time interval and means for restarting a count of the time interval upon activation of a manual reset switch which may be a dedicated button switch or key sequence. When the user set time interval is passed the PLB initiates automatic transmission of the distress signal.

In so doing the user acknowledges his/her safety by restarting the count and thereby preventing the PLB from sending a distress signal upon elapse of the time from the initially set time interval.

The PLB may also has an emergency switch which the user can activate for immediately initiation of transmission of a distress signal regardless of the state of the timer. Similarly this switch can be a dedicated button switch or key sequence. The PLB may also have another dedicated switch for disabling or enabling the timer.

In another typical example of the present invention the system may be a digital mobile phone messaging system using a terrestrial and/or satellite based radio communications wherein the device in the form of a mobile telephone or short messaging service (SMS) capable transceiver automatically transmits an emergency or distress signal addressed to a search and rescue (SAR) or emergency service organisation within a preset time interval in the event of incapacitation of the user. The device has a timer which is used to provide the preset time interval. Upon elapse of the preset time interval the device initiates automatic transmission of a distress signal.

The distress signal may be in a short datagram format such as a preprogrammed SMS message. A reserved network address or group of network addresses can be arranged for the purpose of receiving short datagram format distress messages. The monitoring station may include a short datagram format terminal sub-station for the monitoring of the reserved network address or group of network addresses. Upon receiving a short datagram format message the short datagram format terminal sub-station decrypts and displays the contents of the message to an operator of the monitoring station The short datagram format terminal sub-station may be any suitable computer or intelligent terminal capable of receiving short datagram format messages and also capable to performing decryption of the message's contents and then displays these in a meaningful way on a console interface.

Desirably the system of the present invention is adapted to communicate using a communications protocol for defining the contents of distress messages. Once an operator of the short datagram format terminal station has validated the distress message received, this information can be passed onto an emergency service organisation proximate to the transmitting the distress message. The information may be relayed n a short datagram format.

In yet another typical example of the present invention the signaling device is in the form of an Internet communication capable portable device (client) which may communicate over a wireless or mobile network with the monitoring station (host) adapted to manage a multi-client message-scheduling timetable. Both the client and the host device are capable of transmitting, receiving and interpreting encrypted datagrams to and from each other over the Internet using an application layer protocol specific to the system. The user of the client may send specific datagrams to the host by activation of a manual switch or by action such as pressing of a dedicated button or key sequence.

The host has a message-scheduling timetable data structure (timetable) for a plurality of clients. The host uses the timer as a reference for the timetable. This timetable acts a simultaneous array of separate timers each corresponding to an individual client; referred to hereon as a timetable entry. The client may have another timer; referred hereon as the 'onboard parallel timer' which is set in synchronisation to the timetable entry by communicating using the application layer protocol. The host timetable entry is set upon the passing of a specified time interval for this entry to initiate automatic transmission of a pre-programmed alert message; hereon referred to as the 'alert message table entry' to a nominated third party address stored in the data structure. The client may program the contents of this message and the nominated recipient address at an earlier time by requesting to write to its specific alert message table entry on the host using the application layer protocol. Furthermore the GPS location of the client may be written and subsequently updated in the contents of this specific alert message table entry with each consecutive communication from client to host. The client may as required upon pressing of a dedicated button or key sequence by the operator, reset its timetable entry on the remote host in synchrony with the resetting of its onboard parallel timer thereby preventing the automatic sending of the pre-programmed alert message by the host for a further interval. In a similar manner the automatic messaging services of the host may be dismissed by the client under the control its operator should they not be required.

An advantage of this embodiment of the present invention is, that should the client device fail to function due to being damaged in a mishap along with the user, an alert may still be raised in the host upon the passing of a specified time interval by the relayed message to the nominated third party. This embodiment of the present invention is well suited to the hardware of existing Internet capable phone designs as it may be possible to implement as software running on such a phone.

The flexibility of this embodiment of the present invention to nominate for the purpose of example a community health care organisation as the specific recipient address to alert messages generated on behalf of clients within the system may grant it a more general appeal in domestic situations. This could be used in assisting in monitoring the safety of elderly or disabled people who live alone on behalf of these health care organisations.

The protocol can be adopted by the many SARs and emergency service organisations throughout the world. The protocol can be directed to the placement and encoding of relevant information into the body of a SMS datagram containing information fields such as the followings:

Unique emergency message service registry identifier
Nationality of operator
Location co-ordinates as reported by a GPS unit
Number of persons accompanying operator
Categorized type of activity the operator was engaged in prior to the distress such as rock climbing, orienteering or boating.

Index numbers for government or private health records subject to the legality of the transmission of such information.

Portions of this data may be encrypted and stored on a non-volatile memory device such a SIM card. The user or service provider may enter some fields of this information at time of purchase and other fields may have be updated by the operator at the time of use as prerequisite for the timer function to be enabled.

It would advantageous for the present invention to provide an audible warning alarm at a predetermined interval prior to transmitting a distress signal whereby the sounding of this alarm could notify the user an automatic distress signal transmission is imminent should he/she fail to acknowledge safety to the device to prevent it from doing so. Furthermore this audio alarm could be programmed to sound at a set of decreasing time intervals growing in intensity as the time for the automatic distress signal transmission approaches.

The present invention would benefit from robust construction. A waterproof or at least water-resistant impact resistant casing capable of protecting the operation of the device despite having been dropped or struck against a hard surface is recommended for this invention. It is recommended that the present invention be given an eye-catching colour.

Particular to the Mobile network embodiment of the present invention, some benefit could be gained from a procedure on power up whereby the contents of the SIM or user programmable memory module is duplicated to another memory within the device. In the event should failure occur on one of the electrical contacts to the SIM or user programmable memory module due to impact, operability of the device and it's ability to transmit the operator's specific data may not be lost.

A small motor drive for automatic extension of the antenna is recommended for the PLB embodiment of the present invention. Prior to automatic distress signal transmission the motor drive for automatic extension of the transmission antenna may be engaged. If the antenna cannot be extended automatically within a given interval the motor will cease attempts at doing so. This will allow the transmitter to perform with the benefit of suitable antenna signal gain wherever possible. The present invention would benefit from the ability to communicate with other devices such as personal computers or other data terminal equipment for the purpose of easy operator data programming and device testing and maintenance.

In order that the present invention can be more readily understood and be put into practical effect reference will now be made to the accompanying drawings which illustrate one preferred embodiments of the invention and wherein:

DESCRIPTION OF THE PREFERRED EMBODIMENT

Figure 1:
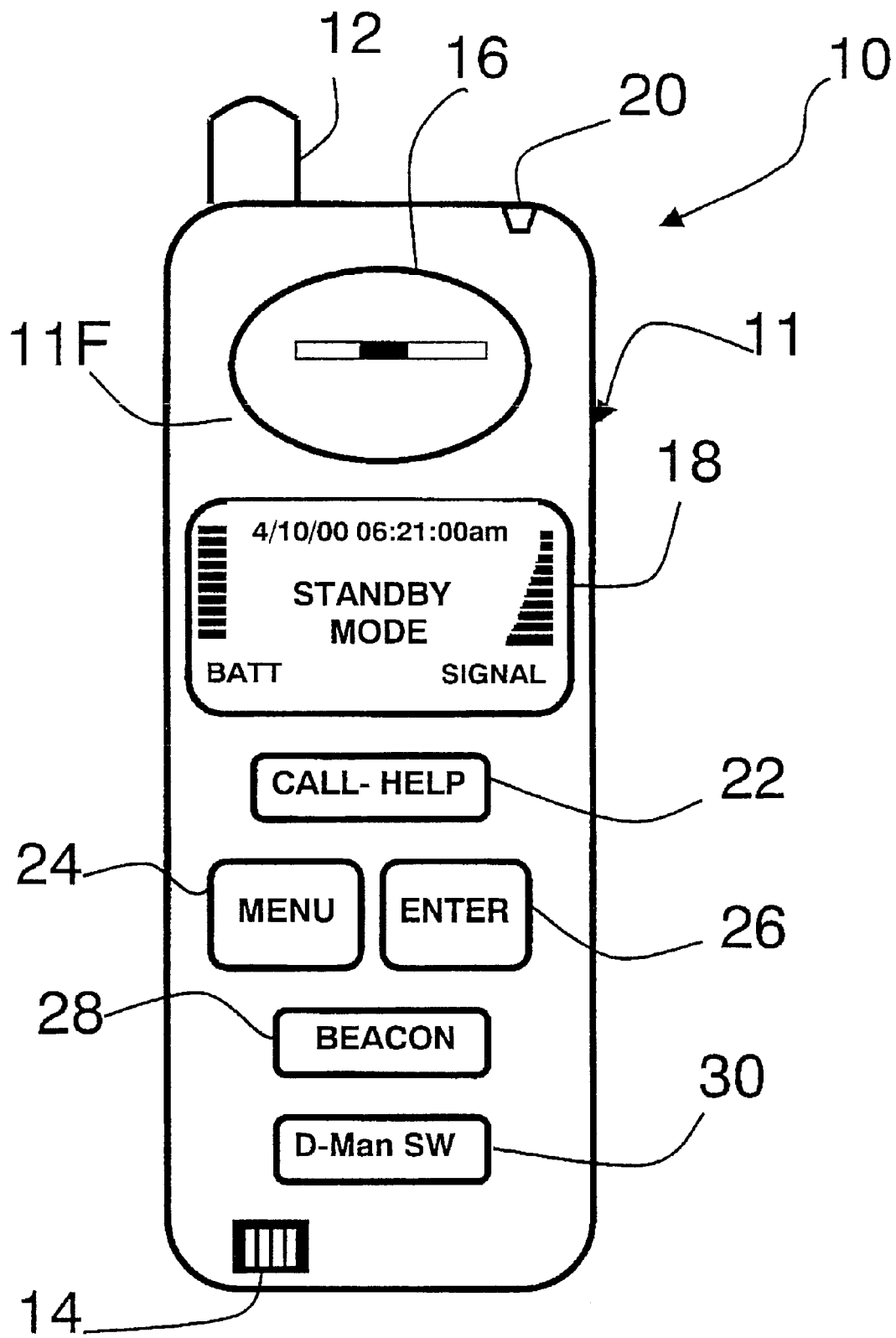
FIG. 1 is a schematic diagram showing a front view of one embodiment of the emergency signaling device according to the present invention.

Referring to the drawings and initially to FIG. 1 there is shown an embodiment of the emergency signaling device 10 according to the present invention. The device 10 as can be seen is in the shape of a mobile telephone having a housing body 11 with an antenna 12, a microphone 14, a speaker 16, an LCD display unit 18, an indicator light 20 and a set of buttons 22 to 30 on the front face 11F of the body 11.

Figure 2:
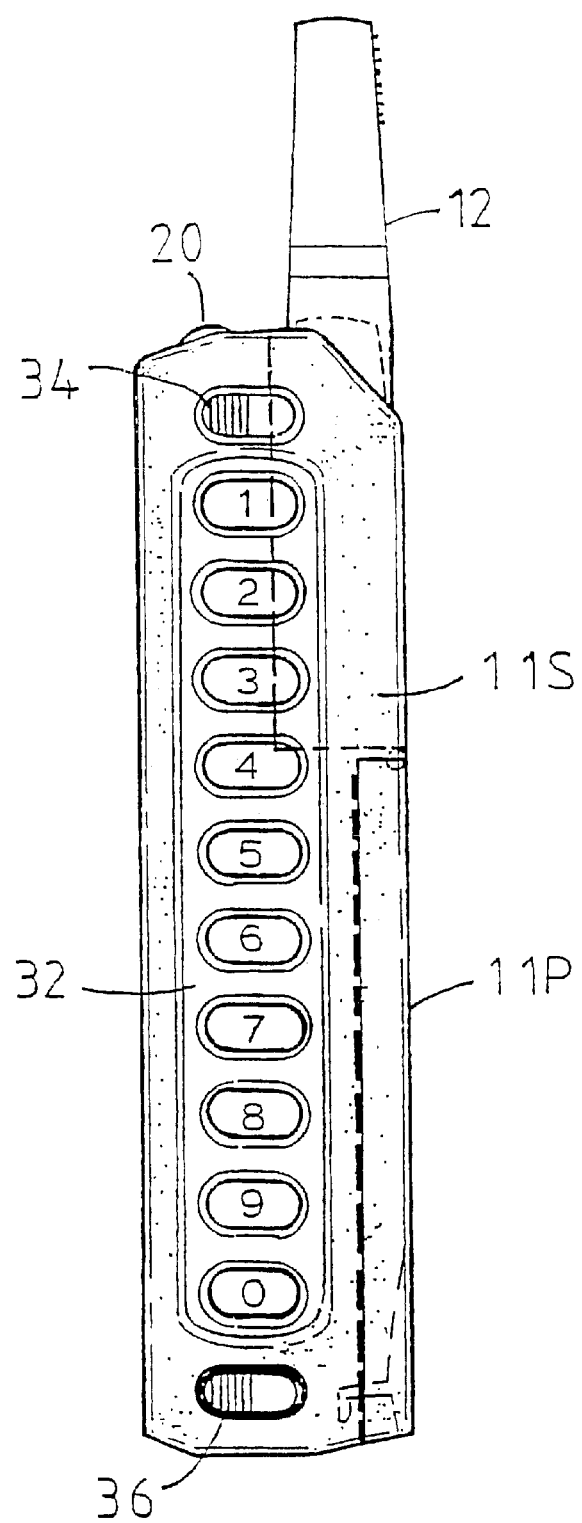
FIG. 2 is a side view of the device shown in FIG. 1.

FIG. 2 shows the antenna 12 in an extended position for use in an area where signal reception is relatively weak. This figure also shows a numeric key pad 32 provided on a side wall 11S of the body 11. A power ON/OFF switch 34 and a power saving switch 36 are also provided on the side wall 11S.

Figure 3:
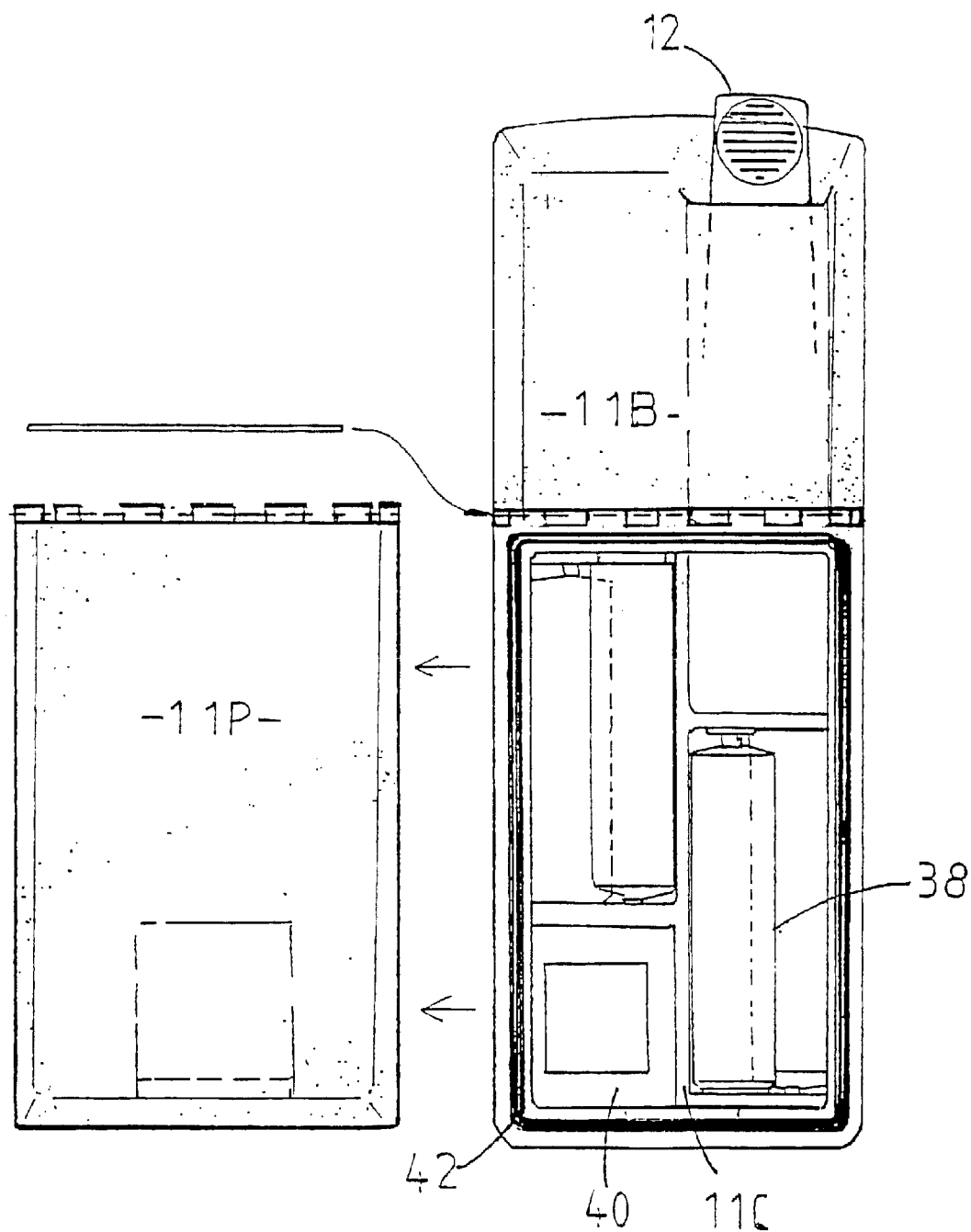
FIG. 3 is a rear view of the device shown in FIG. 1.

Referring now to FIG. 3 the body 11 has a base 11B with an opening for accessing a chamber 11C for accommodating battery units 38 for powering the device 10 The chamber 11C also has an interface (not shown) for connection with a SIMM card 40 on which are stored a user reference including a user name and a user identification number (PIN), device identification, and communications protocols. A cover part 11P is hingedly connected to the base 11B and it can be swung open for replacing the battery units 38 or the SIMM card 40. In this embodiment a piano type hinge joint is employed for the hinge connection.

Referring to FIG. 1 again the device 10 is adapted to display the battery status and reception signal strength on the display unit 18. Time of day, date and the current mode of operation are also displayed. The device shown in FIG. 1 is in the standby mode. Other operation modes including a suspension mode can be selected by pressing an "ENTER" button 26 when the appropriate selection menu appears on the display unit 18.

"A MENU" button 24 is used to highlight the date and time components in succession for adjusting by pressing the appropriate keys of the key pad 32 and then pressing an "ENTER" button 26. The "MENU" button 24 is also used to bring up certain items stored on the SIMM card 40 and operation modes available for the device 10. These items include time delay for dialing a stored emergency telephone number and transmitting the user name and PIN, the user PIN, beacon preference and emergency voice call number. The time delay can be adjusted as described above The user may selectively choose to enable or disable any of the service items by selecting ON or OFF sign on the display unit. The SIMM contents are automatically updated when the PIN or any of the items is changed. The changed PIN and operation status are also sent for updating user registration database.

So that the device 10 can be used in adverse weather conditions, rugged terrains and during boating the body is made of cast metallic or a strong plastic material An example of the cast metallic material is aluminum, and has a waterproofing membrane around all or each component parts that may be affected by moisture. For this reason a sealing material 42 is provided around a peripheral ledge about the opening in the base 11B and the cover part 11P is configured to be in snap fit over the sealing material 42.

Figure 4:
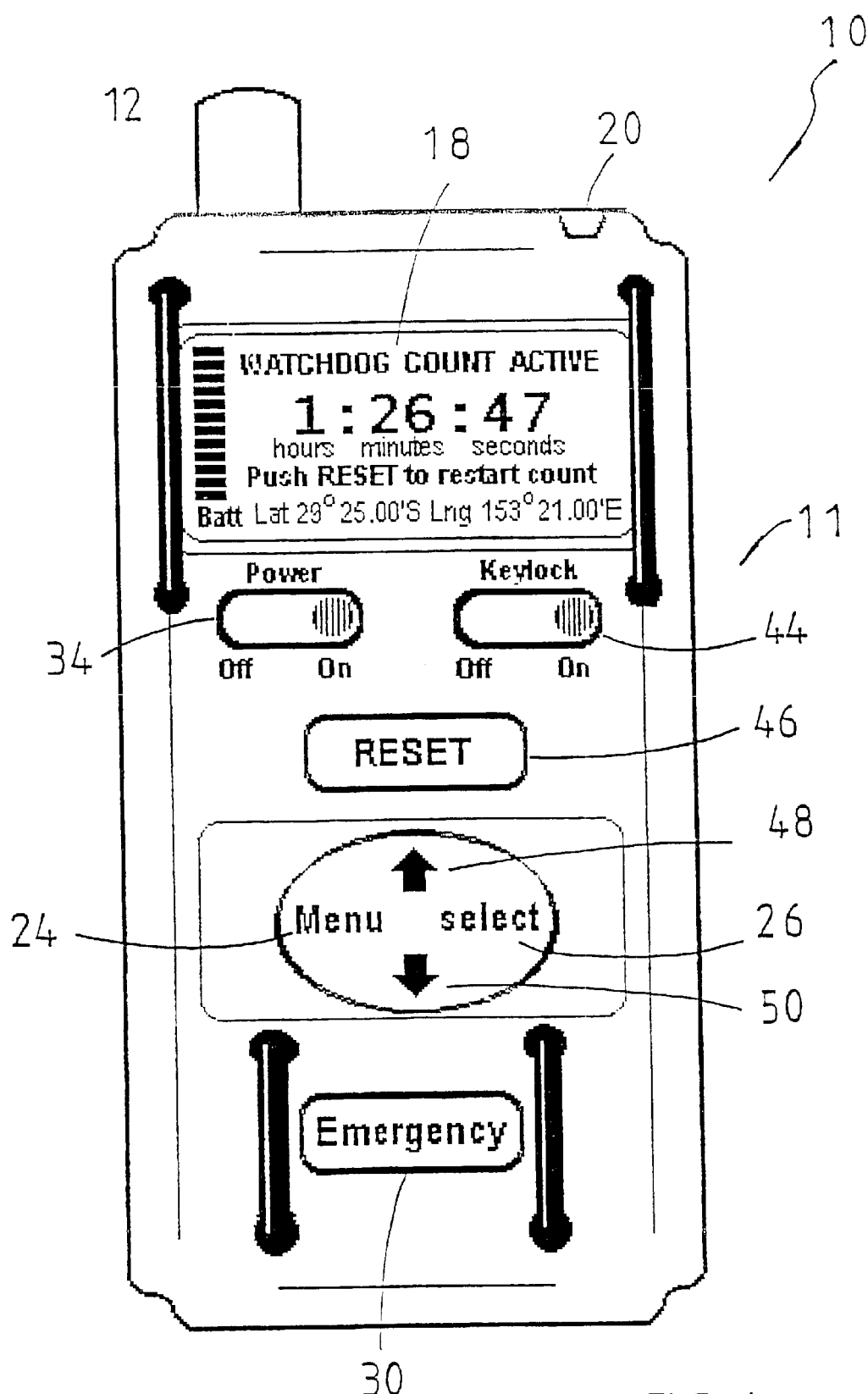
FIG. 4 is a schematic diagram showing a front view of another embodiment of the emergency signaling device according to the present invention.

FIG. 4 shows another embodiment of the device 10 according to the present invention. This embodiment is substantially similar to the FIG. 1 embodiment. For clarity the same reference numerals are indicated for the same items between the two embodiments. In this embodiment the device 10 has a GPS receiver and the received GPS signals are calculated to indicate the coordination of the device 10 as shown in the display unit 18. It also has a keylock switch 44 for preventing accidental activation of the emergency switch 30. A reset switch 46 is provided for restarting the count down to the time period selected for transmitting an emergency signal. The reset switch 46 thereby extends the time for transmitting an emergency signal every time it is pressed. The menu button 24 in this embodiment is a part of a multi directional switch pad that includes an up navigation button 48, a down navigation button 50 and the "Select" button 26. Pressing the menu button 24 will some of the menu items of a menu page on the display unit 18. Pressing it again will progress to the next menu page and so on. The buttons 48 and 50 are used to navigate through menu items of the menu page on the display unit 18. The device 10 is programmed to highlight a menu item currently on the display unit 18. The highlighted menu item can be selected by pressing the "Select" button 26.

To use the device 10 the power switch 34 must be in the ON position. Before allowing communications operations the device 10 prompts for entry of the user's PIN by pressing the appropriate numeric keys corresponding to the PIN and the "ENTER"/"Select" button 26. When the entered PIN matches the PIN stored on the SIMM card 40, the device checks the user selected preferences of operation modes and activates the modes accordingly.

Figure 5:
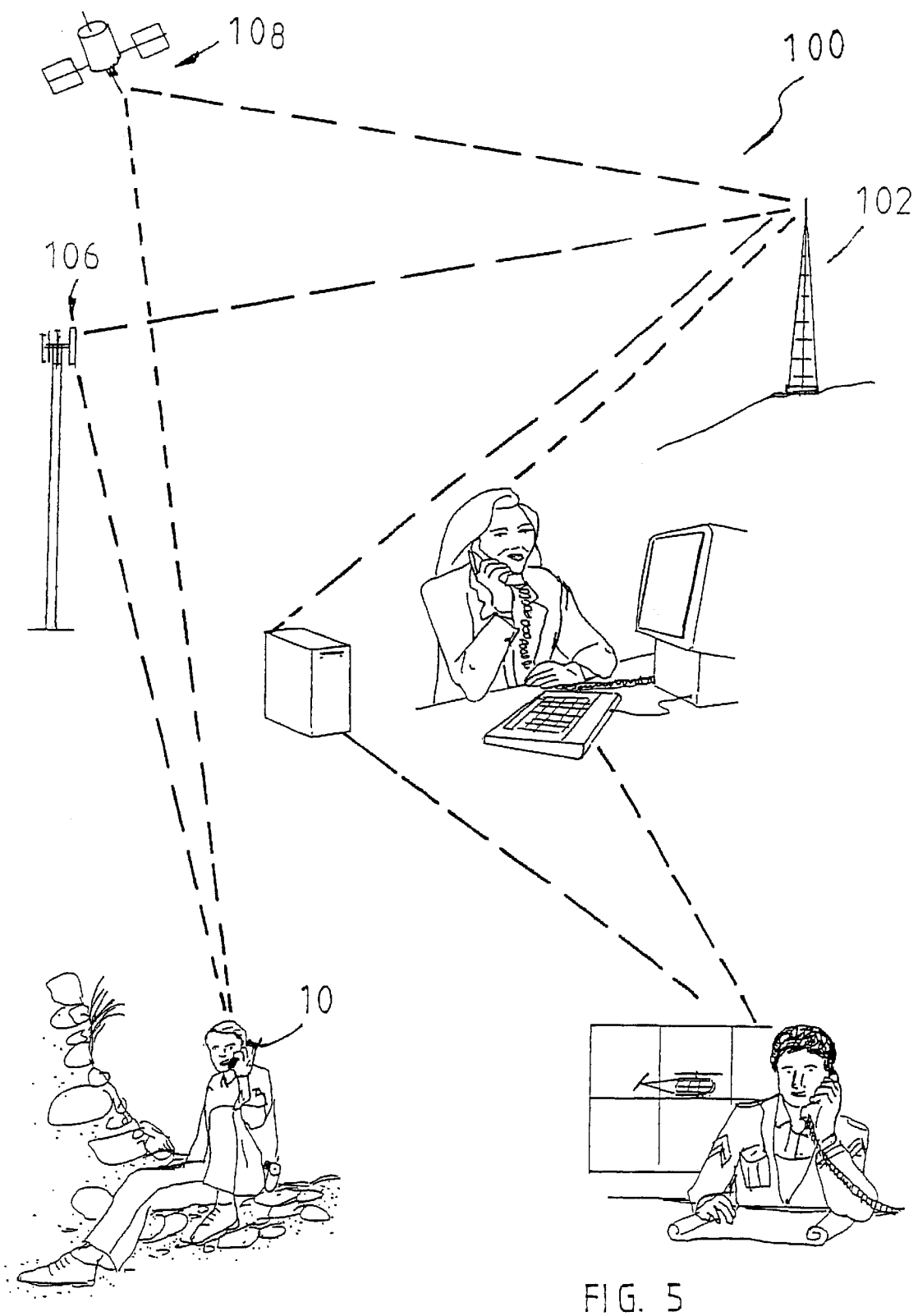
FIG. 5 is a schematic diagram showing an embodiment of the emergency communications system according to the present invention.
Figure 6:
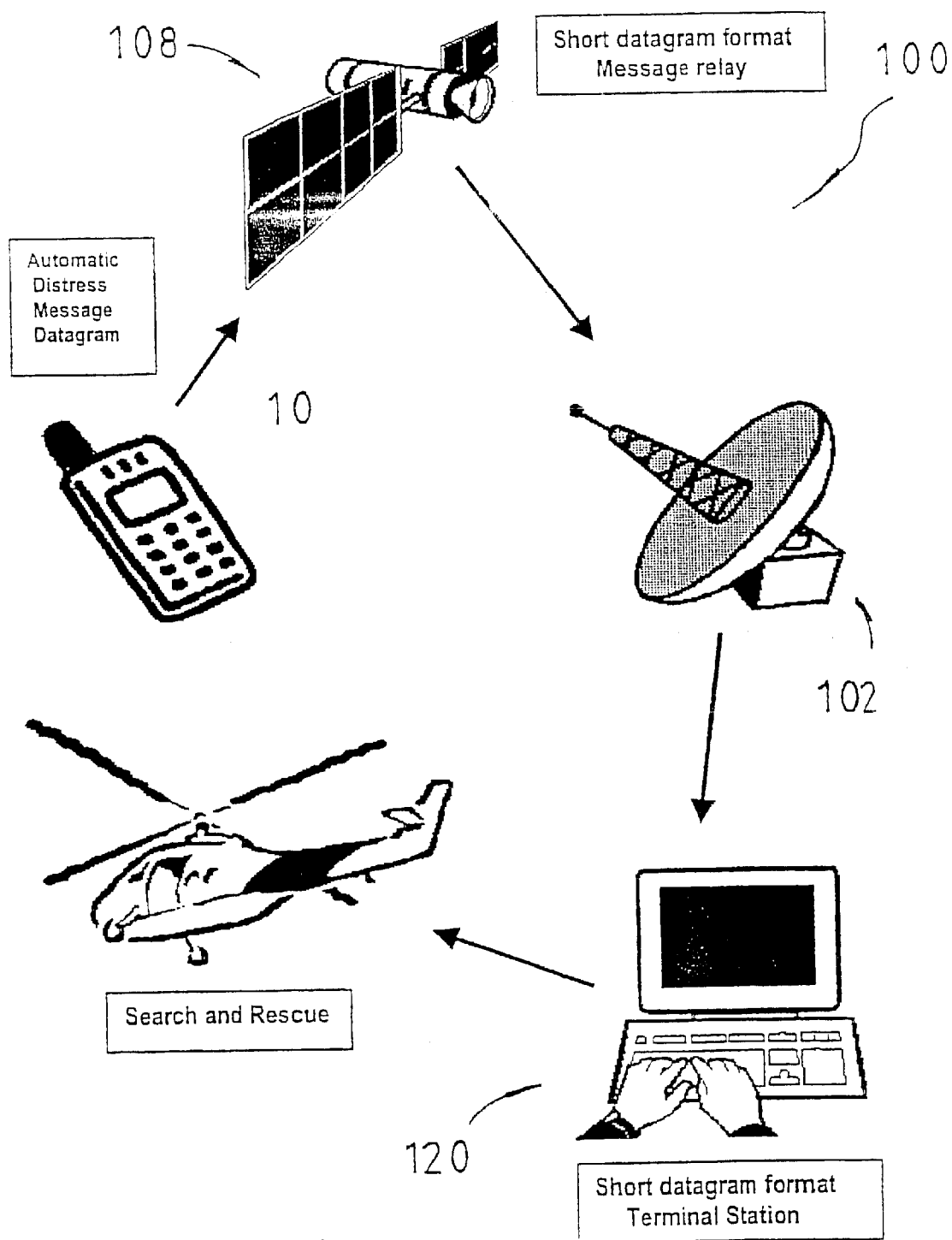
FIG. 6 is a schematic diagram showing another embodiment of the emergency communications system according to the present invention.
Figure 7:
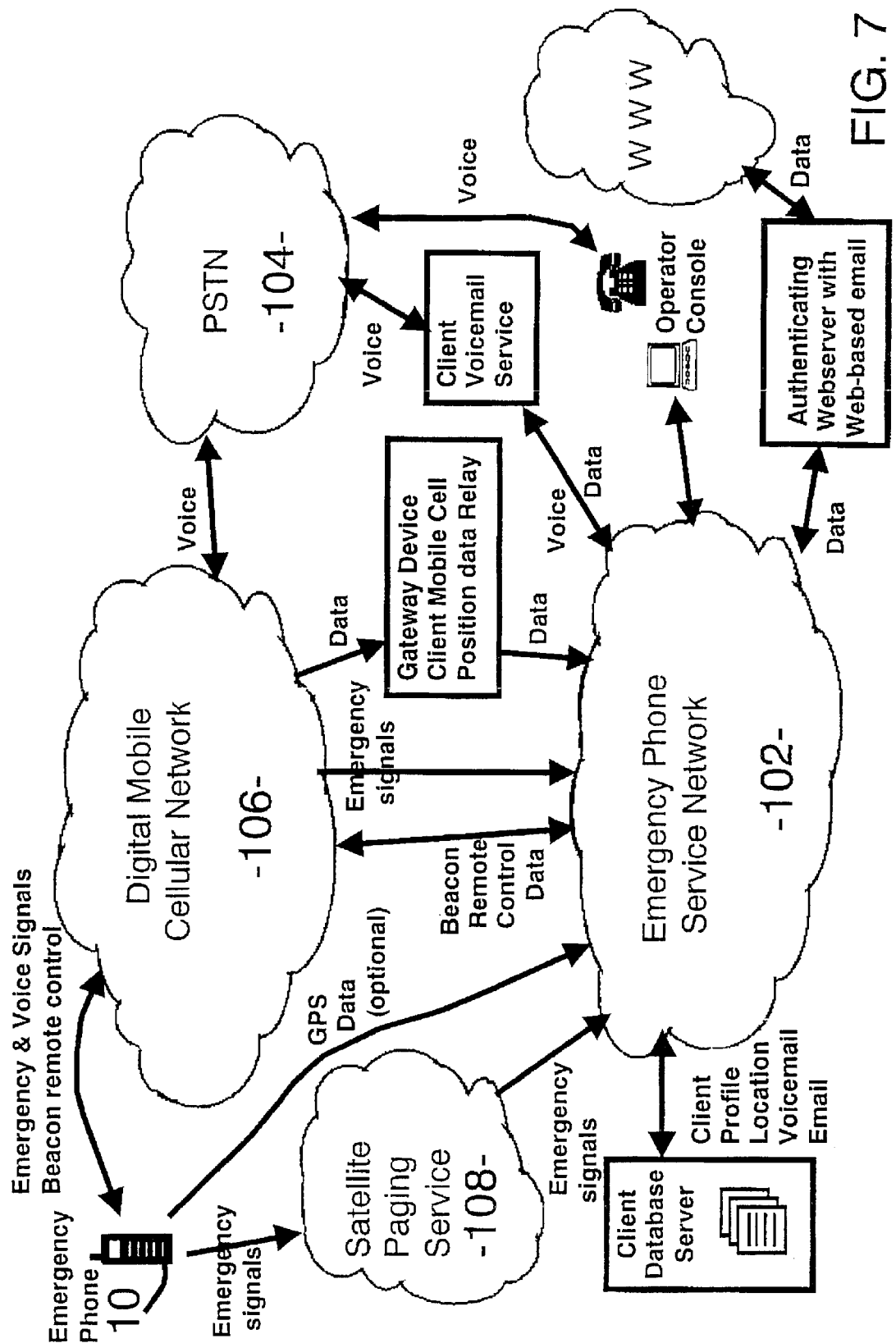
FIG. 7 is a schematic diagram showing interconnections between communications networks for the emergency communications system shown in FIGS. 5 and 6.

The device 10 then transmits a registration signal to an emergency communications network 102 of an emergency system 100 as shown in FIGS. 5 to 7.

The system 100 shown in FIG. 5 has a signaling device 10 that is capable of communicating with a monitoring station 120 through a satellite 108 or a mobile relay tower 106. In FIG. 6 the device 10 communicates with the monitoring station 120 only through the satellite 108.

Turning to FIG. 7 the system 100 in this embodiment communicates with the device 10 over a land line telephone network 104 and/or a wireless communications network 106, or a satellite communications network 108. The wireless communications network in his case is a cellular mobile telephone network.

The monitoring station 120 has at least one emergency service computer server 110 which has a data storage adapted to store a database of user references which include user names and corresponding user PINs and user provided information in voice and/or data formats about personal details of the users and their intended activities and locations and/or travel routes.

The user may use the device 10 to place a message as a voice information for storage at the server 110. Alternatively the user can dial a specified telephone number and entering the PIN for accessing the server 110 for storage of information. A further alternative is to use the WWW to connect to the server through the emergency network 102 for storage of email messages and/or voice information. In this case the emergency network 110 is operating under the Internet protocol (IP).

When the emergency or deadman/emergency switch 30 is activated the device 10 starts to count down to a user specified length of time stored in the SIMM card 40. About 5 minutes (which can be set to different length of time by the user) before reaching the specified length of time an audio alarm is set. The user may disable transmission of emergency signals in the form of an emergency telephone number to the system 100. If there is no intervention by the user the emergency signals will be transmitted at the expiration of said specified time. Thus the device 10 will transmit emergency signals even if the user is unable to use it.

The emergency signals include the user name registered with the device 10 and the PIN. The server 110 on receiving the user name and PIN searches for a match with one of those on the storage and will display or play back any stored information under the user name. The stored information can be relayed directly to an emergency authority or an operator can contact the authority and advice the user information.

As the location beacon 28 is automatically activated when the emergency signals are transmitted the system 100 can locate the user to at least within the cellular cell that first receives the emergency signals. The user information will inform who the user is and any preexisting medical conditions of the user. The travel details will also assists in locating the user quickly.

For use in remote regions the device 10 can be switched to operate as a satellite pager transmitting the emergency signals to the emergency network 102. It can also include a GPS beacon so that the device 10 can be located by a GPS satellite. The display unit 18 in FIG. 4 shows the location information derived from GPS.

Figure 8:
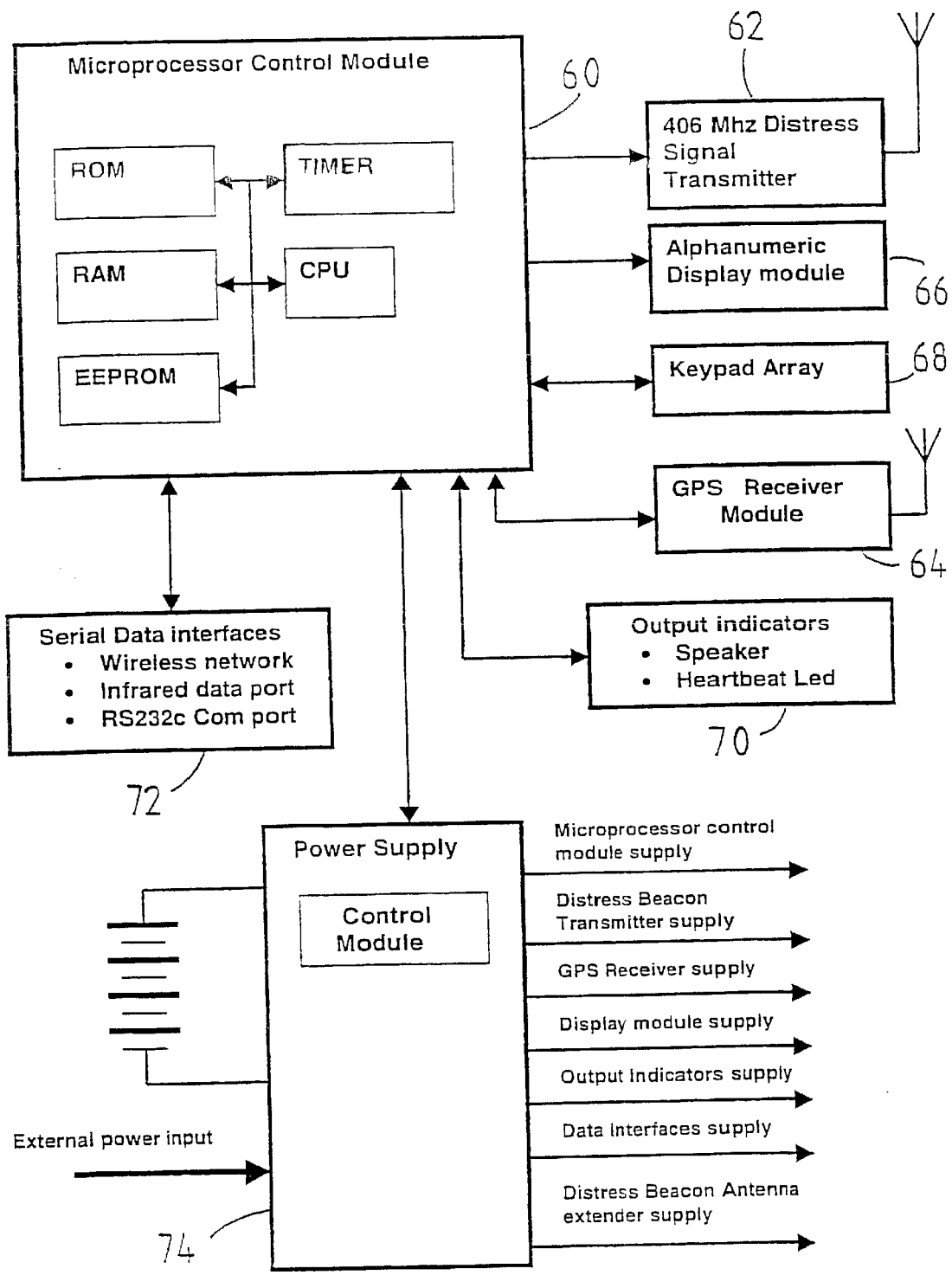
FIG. 8 is a block circuit diagram showing modules in a personal location beacon according to the present invention.

Turning now to FIG. 8 there is shown a block diagram of major component modules of the PLB embodiment of the device 10. The PLB has a microprocessor control module 60, a 406 MHz distress signal transmitter 62, a GPS receiver module 64, an alphanumeric display module 66, a keypad array 68, output indicators 70, serial data interfaces 72, and a power supply unit 74 arranged as shown therein.

The control module 60 acts as the master control circuitry. Pre-programmed memory devices store programs for the central processing unit (CPU). Programmable non-volatile memory devices allow enhancements to these programs to be added at a time after manufacture. This type of memory also stores specific data pertaining to the user. Some of the data are used within the distress beacon's message. The CPU master program supervises communication with the other modules in the device 10. The timer is a programmable counter circuit under the control of the CPU capable of asynchronous timekeeping with respect to the CPU's functioning. The Timer has the ability to interrupt the CPU on reaching a specified count value or in some instances automatically reset the CPU if not communicated with by the CPU within a specified interval. The control module 60 can switch the power supply 74 into a low power consumption mode of operation or 'sleep mode' under which only critical functioning is supported until the device 10 is activated by either a timer interrupt or recognisable external event such as a key press.

The transmitter 62 is a radio transmitter for transmitting distress signals to the Cospas-Sarsat satellite array. This transmitter 62 is designed to adhere to the specifications of the International Cospas-Sarsat programme. The control module 60 acts as controller of this transmitter 62 and supervises the data transmitted in the distress message.

The GPS module 64 has a GPS receiver decoder. Radio signals from the GPS array of satellites are detected and positional co-ordinate information is calculated within this module of the device upon the demand of the control module 60.

The display module 66 has an illuminated display for the purpose of showing the user the status of the device 10, battery strength, watchdog counter value, positional co-ordinate information and stored user registration data under the control of the control module 60 When programmed in conjunction with the keypad array 68, the display module 66 act as an user interface whereby the user may programme the device 10 using menu based programming structure.

The keypad array 68 is a group of switches for modifying or programming the control module 60 and is accessible to the user The switches include a timer reset button, emergency beacon button, operator interface menu buttons, device on/off and keylock switches as shown in FIGS. 1 to 4.

The output indicators 70 have a flashing 'heartbeat' LED and compact sound transducer, which acts as an audio alarm.

The control module 60 controls communication with external devices such as a personal computer and a test equipment via interfaces 72. An infrared interface or wireless network protocol interface may be provide for communication without direct cable connection. A serial communication link using RS232C style adapter could be accommodated in this module.

The controlled regulation circuit in the power supply 74 which regulates the flow of current from the power supply 74 to other modules within the device 10 under the supervision of the control module 60. This regulation circuit also regulates battery recharging and low power modes of operation.

User information may be stored in RAM or EEPROM or both.

Figure 9:
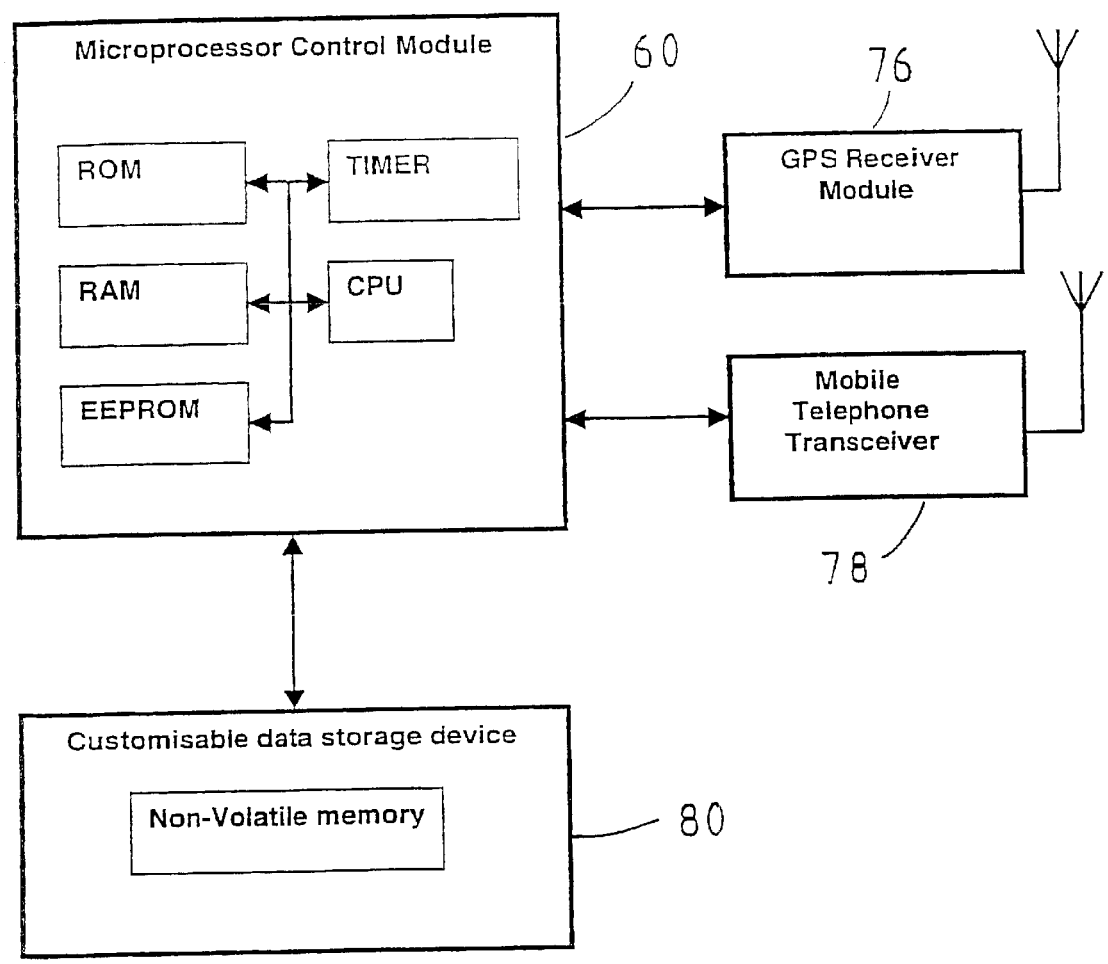
FIG. 9 is a block circuit diagram showing modules in a mobile telephone according to the present invention.

Shown in FIG. 9 are certain component modules in the mobile telephone embodiment of the device 10 according to this invention. This device 10 has a CPS receiver module 76 for receiving CPS signals from GPS satellite array and a mobile telephone transceiver module 78, and a memory module 80 for storing user information.

Figure 10:
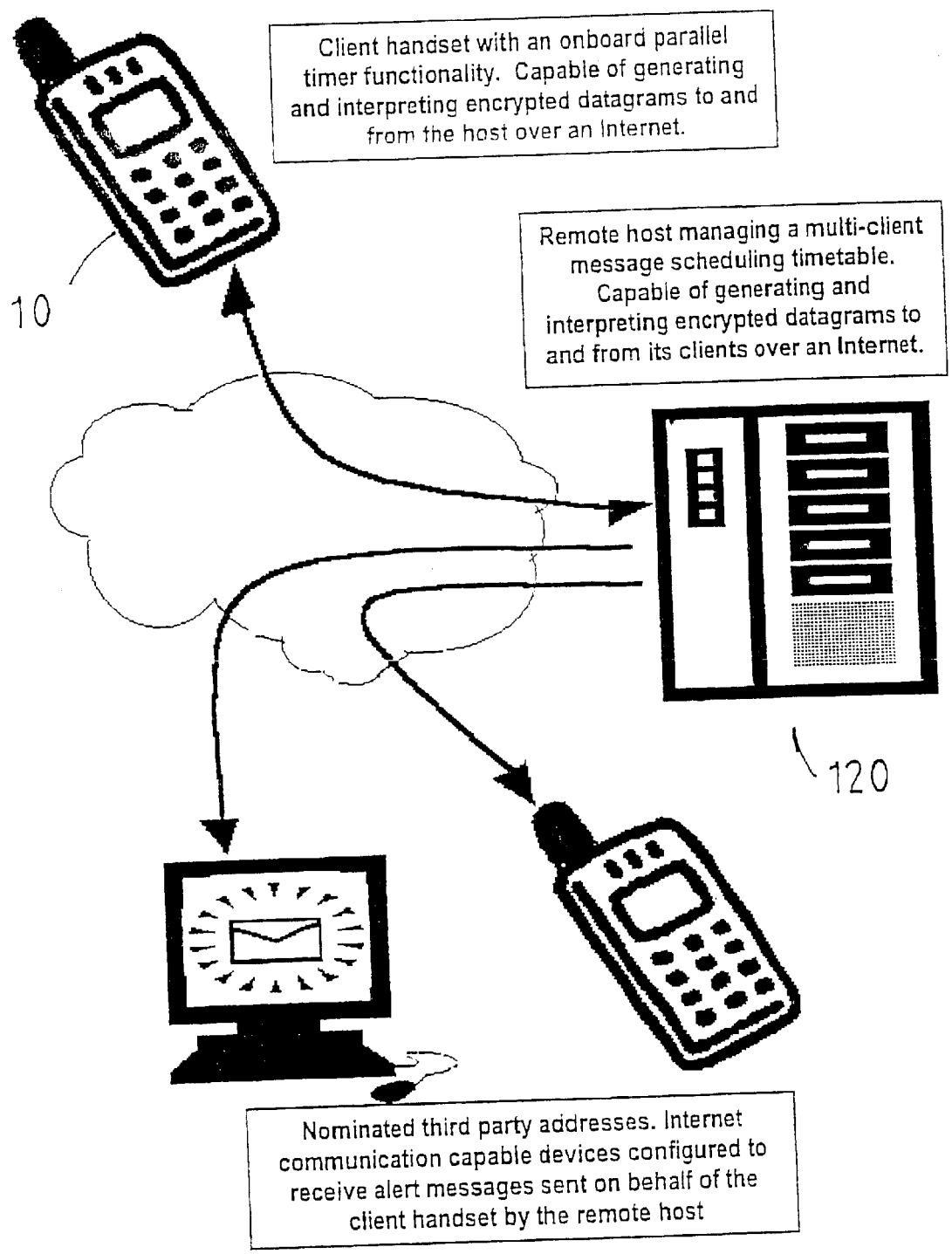
FIG. 10 shows transfers of signals in the emergency communications system of FIGS. 5 and 6.
Figure 11:
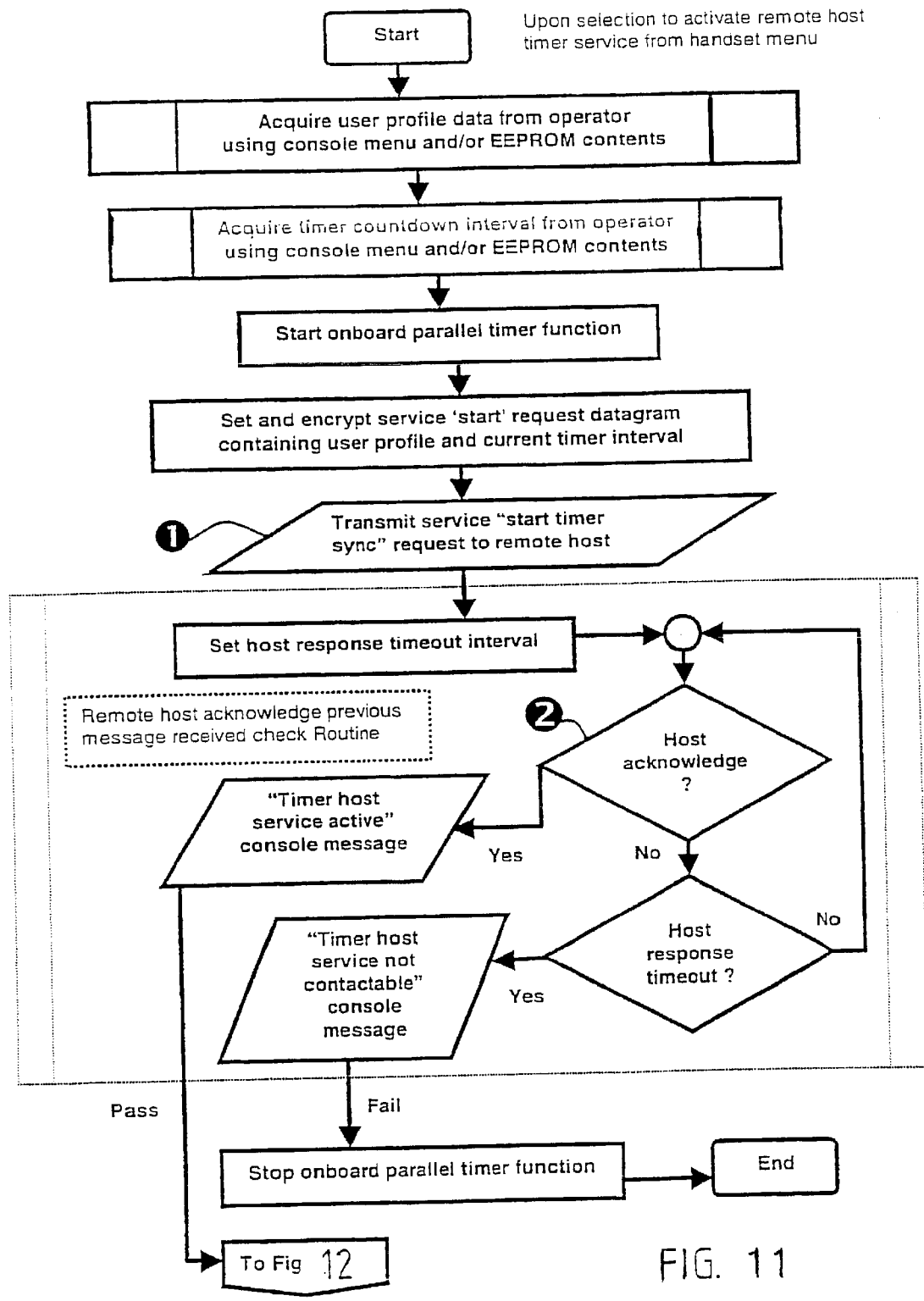
FIGS. 11 to 16 are flow diagrams illustrating certain process steps in the emergency communications system of FIGS. 5 and 6.
Figure 12:
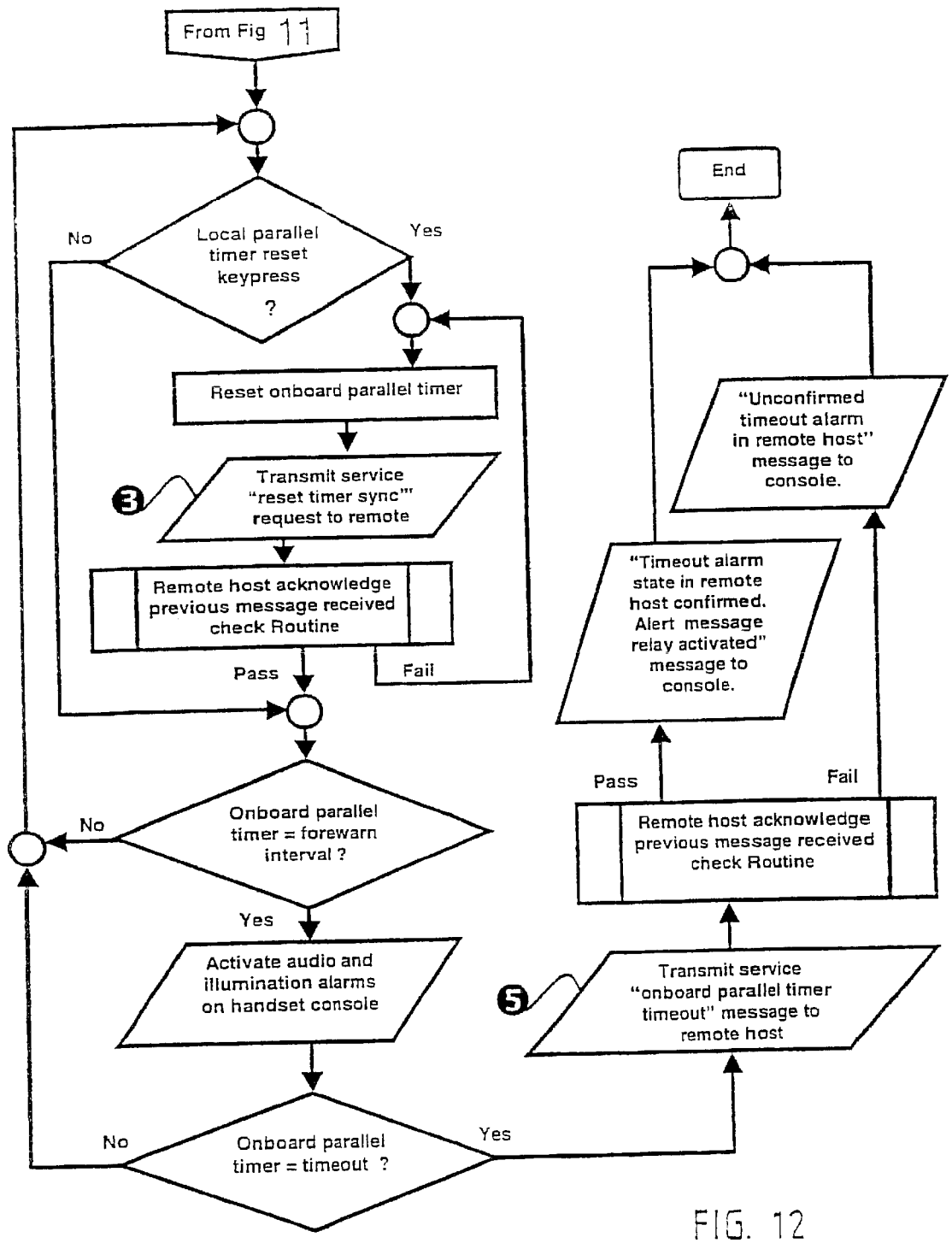
Figure 13:
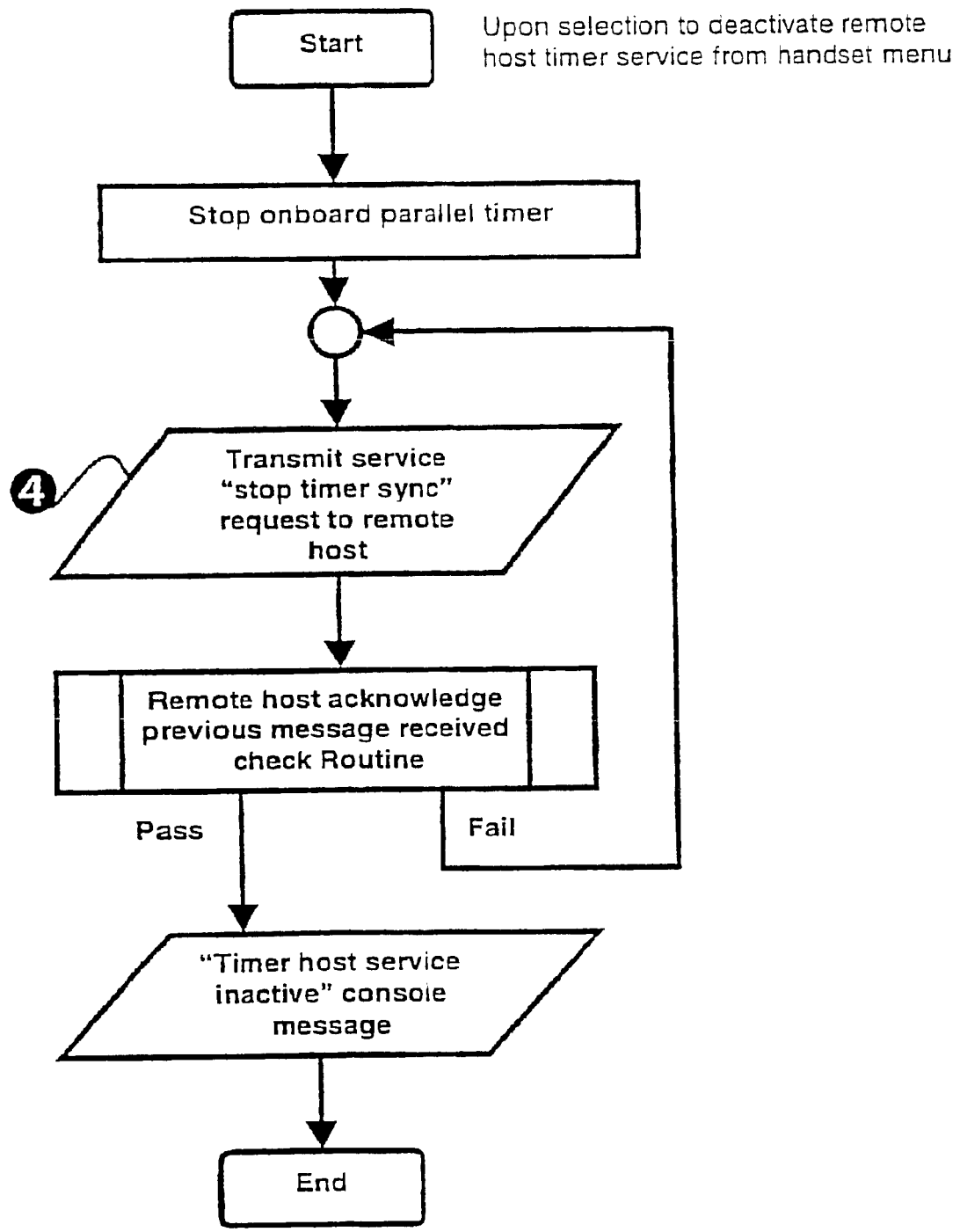
Figure 14:
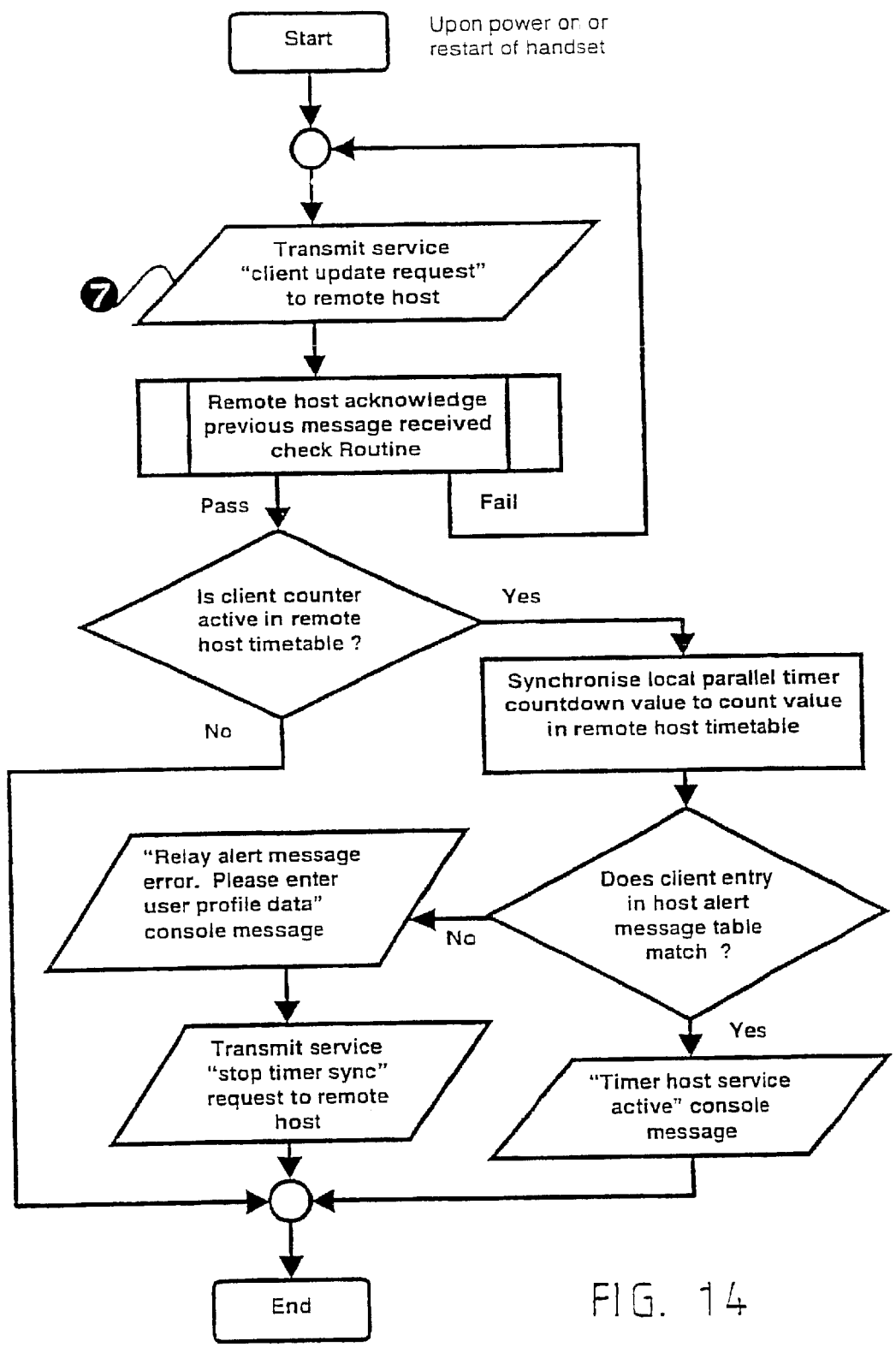
Figure 15:
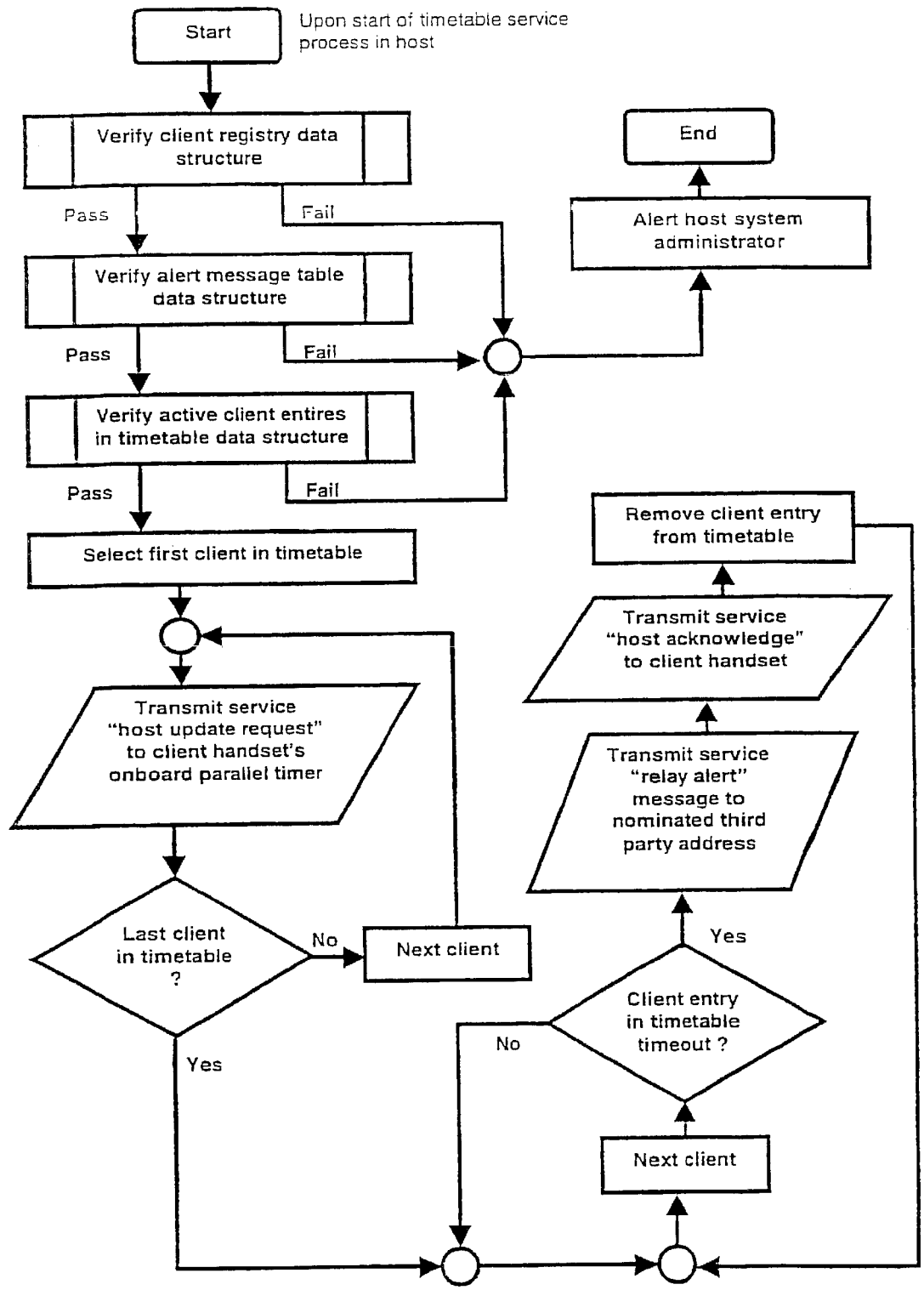
Figure 16:
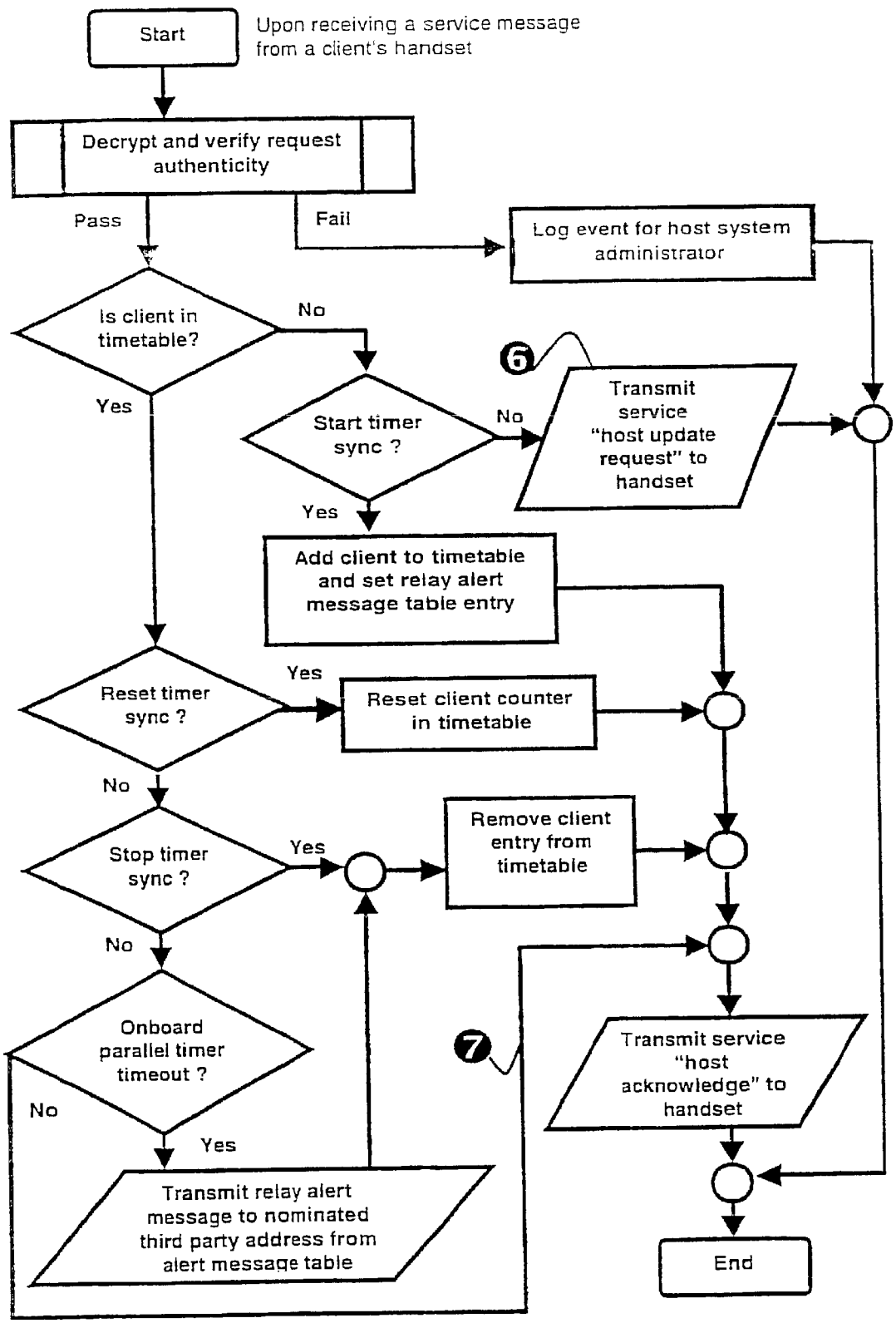

FIG. 10 shows the transfer of a stress signal form the device 10 through the monitoring station 120 to the emergency service organisation shown here as a mobile phone or a computer.

FIGS. 11 to 16 show certain process steps in an emergency communication system 100 according to the present invention. As the function of each process step in the Figures is clearly indicated and one skilled in the art will have no difficulty comprehending the process steps it is believed that there is no need to furnish additional description.

Figure 17:
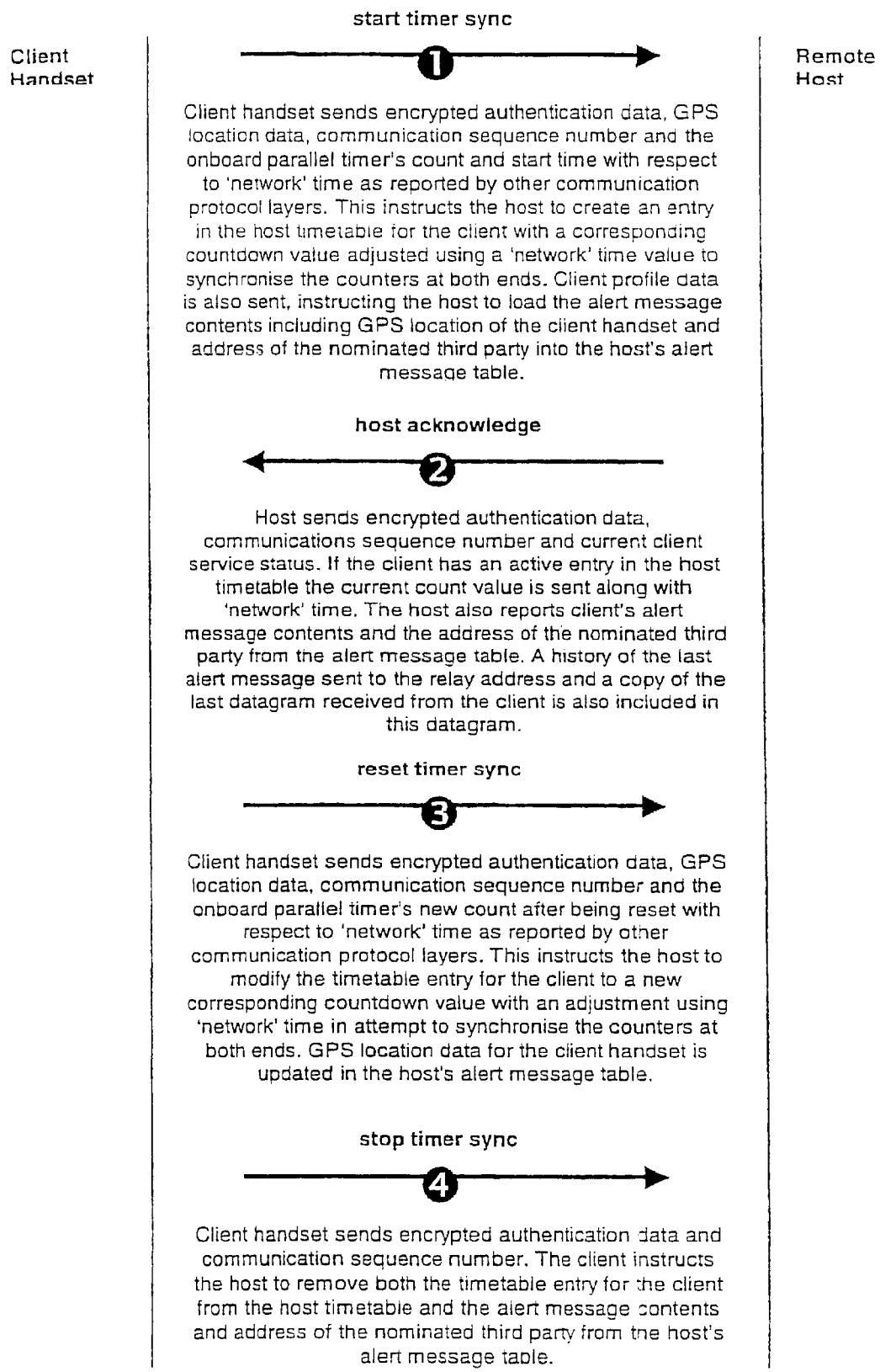
FIGS. 17 and 18 show the exchange of information at certain process steps in FIGS. 11 to 16.
Figure 18:
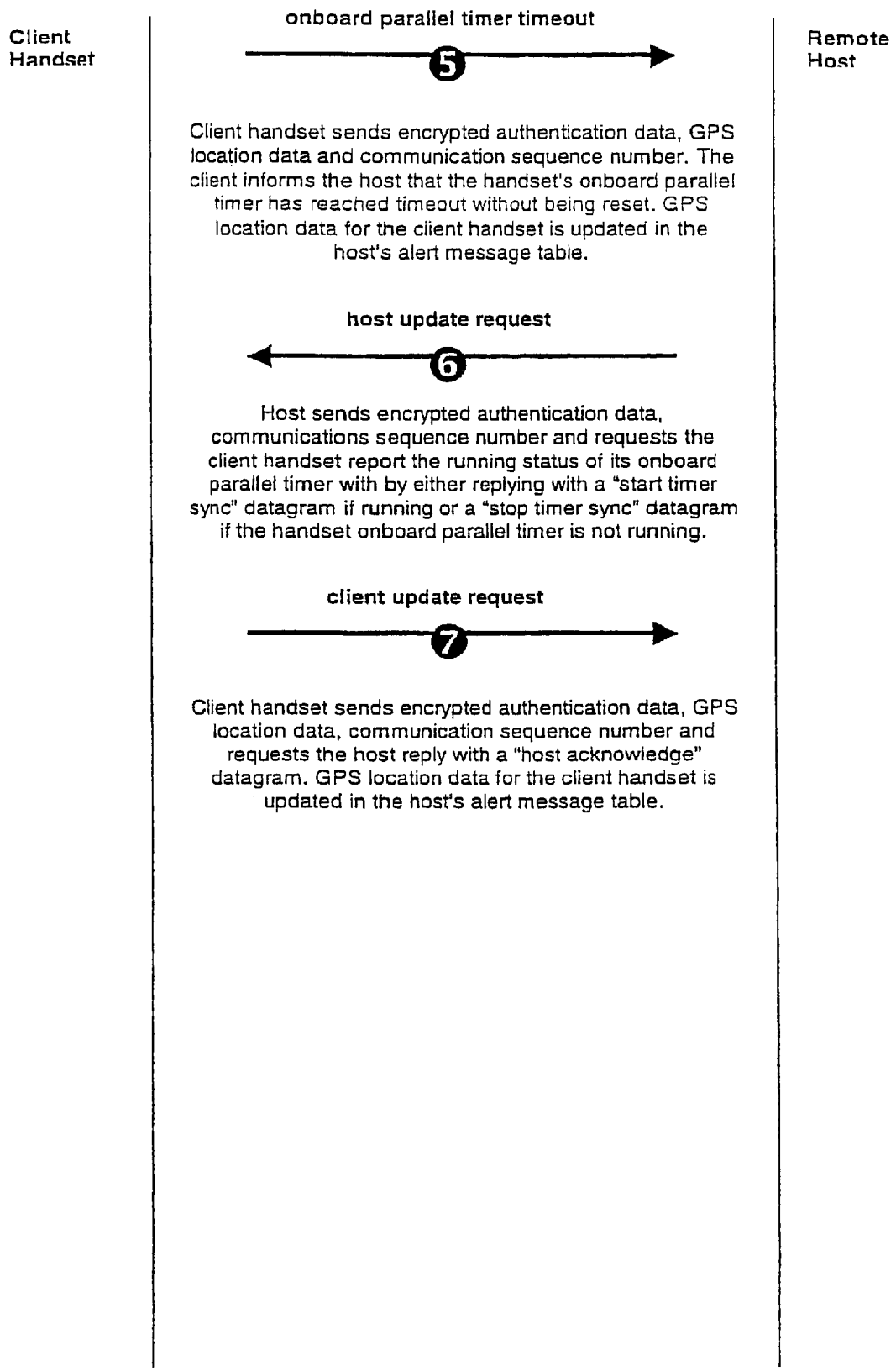

FIGS. 17 and 18 the transfer of information between the client 10 and the host 120 at process steps marked with the references 1 to 7 in FIGS. 11 to 16. Again these Figures are self explanatory.

Whilst the above has been given by way of illustrative example of the present invention many variations and modifications thereto will be apparent to those skilled in the art without departing from the broad ambit and scope of the invention as herein set forth.

What is claimed is:

1. An emergency signalling system including an emergency communications network; a monitoring station having at least one server with a storage means for storing user information and a message-scheduling table, and a timer adapted to operate in real time; and at least one emergency signalling device having a transmitter adapted to communicate with said at least one server over the communications network, and a timer adapted to operate in real time; each said at least one emergency signalling device having setting means for selectively setting the timer thereof to initiate said at least one server or the transmitter to transmit an emergency signal at a time set by said setting means; the monitoring station is arranged to use the server timer as a reference for schedules in said table, and each said device timer is adapted for setting by a synchronisation signal from the monitoring station so as to be in time synchronisation with the corresponding schedule in the table for transmission of an emergency signal; the monitoring station being arranged to initiate transmission of the emergency signal at the synchronised time corresponding to any of said schedules.

2. An emergency signalling device for the system as claimed in claim 1, comprising a timer adapted to operate in real time, setting means for selectively setting a time for transmission of an emergency signal, a transmitter adapted to transmit an initiation signal to a remote monitoring station for transmitting the emergency signal at the set time, wherein said timer is adapted for time synchronisation with a synchronisation signal from the remote monitoring station so K that the time for transmitting the emergency signal corresponds to a schedule for transmitting the emergency signal from the remote monitoring station.

3. The system according to claim 1 wherein said emergency signal corresponds to at least one emergency contact reference for calling emergency assistance.

4. The system according to claim 1 wherein each said device having fixedly or removably installed memory means for storing at least one emergency contact reference.

5. The system according to claim 4 wherein the memory means is arranged to store user information which can be retrieved for transmission with said at least one emergency contact reference.

6. The system according to claim 4 wherein the signalling device including a global positioning satellite (GPS) receiver adapted to periodically receive OPS signals for deriving location information for storage in said memory means, the stored location information being transmitted with said at least one emergency contact reference.

7. The system according to claim 3 wherein the storage means of said at least one server is arranged to store at least one emergency contact reference.

8. The system according to claim 5 wherein the system is arranged to associate user references with respective user information and the at least one server is arranged for a user to access over said emergency network for storing or updating user information and to retrieve stored user information; in use, where the timer is in each said at least one emergency signalling device transmission of said contact reference from each said at least one emergency signalling device is relayed over the emergency network to said at least one server, and the at least one server on receiving said contact reference is adapted to search for a match of the user reference in said contact reference with the user references on the storage means and to retrieve the user information associated with the matched user reference for use by the emergency authority; where the timer is in said monitoring station, the server is arranged to monitor the time(s) set by each said at least one emergency signalling device, at the set time said monitoring station is arranged to retrieve from the storage means the user information associated with the signalling device concerned and communicate the retrieved information to an emergency authority.

9. The system according to claim 1 wherein said signalling device is a radio frequency signalling beacon and its transmitter is adapted to transmit a radio frequency (RF) signal at a predetermined emergency frequency.

10. The according to claim 9 wherein said RF signal including data corresponding to at least one emergency contact reference.

11. The system according to claim 1 wherein said signalling device is a telephonic communications device and its transmitter having a dialling means arranged for initiation by said timer to dial at least one emergency contact reference for transmission by said transmitter at the set time.

12. The system according to claim 3 wherein the device having a user actuatable time delay switch adapted to, when actuated, switch the transmitter to transmit the signals corresponding to said at least one emergency contact reference at the set time.

13. The system according to claim 3 wherein the device including a warning indication arranged to indicate that the device is about to transmit signals corresponding to said at least one emergency contact reference.

14. The system according to claim 13 wherein the device is arranged to prevent said transmission by actuating the time delay switch during said warning indication.

15. The system according to claim 3 wherein said device further comprising a receiver for receiving communications signals over a telephone network and/or a satellite communications network, and a key pad having numerical keys for entering signals corresponding to numbers; the device being arranged so that a user can use the key pad to manually dial the or one of said at least one emergency contact reference, or any other telephone contact number for transmission over said telephone network and/or said satellite communications network.

16. The system according to claim 15 wherein the device including an emergency switch which is arranged to dial one of said at least one emergency contact reference when it is switched on.

17. The system according to claim 3 wherein the device having a location beacon which is adapted to transmit beacon signals intermittently following initiation of transmission of said at least one emergency reference at said set time.

18. The system according to claim 17 wherein said location beacon being remotely controlled to switch on by a control signal received over the mobile telephone network and/or the satellite communications network.

19. The system according to claim 17 wherein the device being selectively switchable between a suspension mode for suspending operation of said location beacon and the operation of emergency signalling, or both.

20. The system according to claim 17 wherein the device is arranged to transmit said beacon signals for reception by the mobile telephone network or the satellite communications network; a switch over arrangement is provided for switching between transmissions to the mobile telephone network and to the satellite network; and the switch over arrangement including a signal strength measuring unit for measuring signals received from the telephone network, and a network switching unit arranged to switch to satellite transmission mode when the received network signals are below a predetermined level.

21. The system according to claim 1 wherein said device having an indication means arranged to indicate at least one of a number of user settable items which include said set time, time of day, date, and user PIN.

22. The system according to claim 21 wherein the indication means is also arranged to indicate battery state, operation mode of the device, and/or signal strength.

23. The system according to claim 21 wherein said setting means including a menu selection arrangement for selectively viewing the or each said settable item, and an item setting arrangement for selectively setting any of the settable items.

24. The system according to claim 1 wherein the device having a power saving arrangement so that a substantially reduced power is consumed in a selected mode of operation.

25. The system according to claim 1 wherein the device includes a casing constructed so that the device is substantially water resistant and/or impact resistant.

26. The system according to claim 1 wherein the device includes controllable driving means and an antenna arranged for automatic extension by said driving means prior to transmission of the emergency signal, and antenna extension sensing means adapted to disable said driving means when the antenna is not extended within a predetermined time period.

27. The system as claimed in claim 1 further including modifying means/step for modifying said user information and/or said set time.

28. The system according to claim 27 wherein said user information including user location indication and said modifying means being adapted to modify said user location indication upon a request for updating the user location.

29. The system according to claim 21 wherein the request in generated periodically or manually, and the location indication being GPS location data automatically transmitted from said device or manually entered and transmitted upon receiving such request.

30. A process for an emergency signalling system including an emergency communications network; a monitoring station having at least one server with storage means for storing user information and a message-scheduling table, and a timer adapted to operate in real time; and at least one emergency signalling device having a transmitter adapted to communicate with said at least one server over the communications network, and a timer adapted to operate in real time; each said at least one emergency signalling device having setting means for selectively setting the timer thereof; the process comprising the steps of:

(a) transmitting from any of the at least one emergency signalling device an initiation signal for transmitting an emergency signal at a time set by said setting means;

(b) on receiving the initiation signal the monitoring station uses the server timer as a reference for entering the time set for transmitting the emergency signal as a schedule in the table;

(c) transmitting a synchronisation signal from the monitoring station for setting the timer of the signalling device which transmitted the initiation signal so as to be in time synchronisation with the corresponding schedule in the table for transmission of the emergency signal; and (d) initiating transmission of the emergency signal at the synchronised time corresponding to any of said schedules.

* * * * *